US007107543B2

(12) United States Patent
Berry et al.

(10) Patent No.: US 7,107,543 B2
(45) Date of Patent: Sep. 12, 2006

(54) SINGLE APPLET TO COMMUNICATE WITH MULTIPLE HTML ELEMENTS CONTAINED INSIDE OF MULTIPLE CATEGORIES ON A PAGE

(75) Inventors: David Berry, San Francisco, CA (US); Larry Neumann, Emerald Hills, CA (US)

(73) Assignee: TIBCO Software Inc., Palo Alto, CA (US)

( * ) Notice: Subject to any disclaimer, the term of this patent is extended or adjusted under 35 U.S.C. 154(b) by 290 days.

(21) Appl. No.: 10/058,152

(22) Filed: Jan. 25, 2002

(65) Prior Publication Data

US 2003/0145042 A1 Jul. 31, 2003

(51) Int. Cl.
*G06F 9/30* (2006.01)
*G06F 15/16* (2006.01)

(52) U.S. Cl. .................. 715/749; 715/744; 715/746; 715/748; 709/203; 709/246

(58) Field of Classification Search .............. 345/748, 345/744, 749, 760; 709/230, 238, 203, 246; 715/744, 746, 748, 749
See application file for complete search history.

(56) References Cited

U.S. PATENT DOCUMENTS

| | | | |
|---|---|---|---|
| 5,842,218 A | 11/1998 | Robinson | |
| 6,073,163 A * | 6/2000 | Clark et al. ................. | 709/203 |
| 6,226,686 B1 | 5/2001 | Rothschild et al. | |
| 6,233,608 B1 | 5/2001 | Laursen et al. | |
| 6,260,148 B1 | 7/2001 | Aggarwal et al. | |
| 6,535,913 B1 * | 3/2003 | Mittal et al. ................ | 709/219 |
| 6,609,158 B1 * | 8/2003 | Nevarez et al. ............. | 719/316 |
| 6,636,245 B1 * | 10/2003 | Estipona .................... | 345/790 |
| 6,697,805 B1 * | 2/2004 | Choquier et al. ............ | 707/10 |
| 6,704,024 B1 * | 3/2004 | Robotham et al. .......... | 345/581 |
| 6,708,161 B1 * | 3/2004 | Tenorio et al. ............. | 707/2 |
| 6,728,769 B1 * | 4/2004 | Hoffmann ................... | 709/225 |
| 6,792,607 B1 * | 9/2004 | Burd et al. ................. | 719/316 |
| 6,797,900 B1 * | 9/2004 | Hoffman ................... | 200/61.62 |
| 6,920,461 B1 * | 7/2005 | Hejlsberg et al. ........ | 707/103 R |
| 6,941,520 B1 * | 9/2005 | Lewallen .................... | 715/762 |
| 6,961,750 B1 * | 11/2005 | Burd et al. ................. | 709/203 |
| 2001/0034771 A1 | 10/2001 | Hutsch et al. | |
| 2001/0037490 A1 * | 11/2001 | Chiang ........................ | 717/2 |
| 2002/0026495 A1 * | 2/2002 | Arteaga ...................... | 709/217 |
| 2002/0032701 A1 * | 3/2002 | Gao et al. .................... | 707/513 |
| 2002/0083154 A1 * | 6/2002 | Auffray et al. ............. | 709/218 |
| 2002/0165907 A1 * | 11/2002 | Dornquast et al. .......... | 709/203 |
| 2002/0169565 A1 * | 11/2002 | Westbrook et al. .......... | 702/20 |
| 2003/0025730 A1 * | 2/2003 | Brennan ..................... | 345/760 |
| 2003/0145305 A1 * | 7/2003 | Ruggier ...................... | 717/100 |
| 2003/0212987 A1 * | 11/2003 | Demuth et al. ............. | 717/130 |
| 2004/0199577 A1 * | 10/2004 | Burd et al. ................. | 709/203 |
| 2005/0050164 A1 * | 3/2005 | Burd et al. ................. | 709/217 |

OTHER PUBLICATIONS

Jonathan Robie et al, "What is the Document Object Model?", 1998, pp. 1-4.*

(Continued)

*Primary Examiner*—Ba Huynh
(74) *Attorney, Agent, or Firm*—Baker & McKenzie LLP

(57) ABSTRACT

A method and a system for communicating with multiple user interface elements contained in multiple categories on a web page with a single client application program at the client computer. Messages are communicated both to and from users interface elements through callback function scripts that communicate through a single client application program that is connected over a point-to-point connection to an agent process on a server.

33 Claims, 17 Drawing Sheets

OTHER PUBLICATIONS

PCT International Search Report, PCT/US02/02313, Jul. 3, 2002, 4 pages.

The Document Object Model (DOM), Part I, http://www.webreference.com/js/column40/, 2 pages, May 31, 1999.

The Document Object Model (DOM), Part II, http://www.webreference.com/js/column40/domvsdhtml.html, 3 pages, May 31, 1999.

Technical Reports and Specifications, http://www.w3.org/TR/, 23 pages, No date given.

HTML 4.01 Specification, W3C Recommendation Dec. 24, 1999, http://www.w3.org/TR/html40/, 12 pages, Dec. 24, 1999.

The Java Developer Connection Documentation and Training, The Java Language: An Overview, http://java.sun.com/docs/overviews/java/java-overview-1.html, 7 pages, Aug. 23, 2001.

Attribute for Applet, Mayscript, http://www.mikodocs.com/tags/applets/_APPLET_MAYSCRIPT.html, 2 pages, Aug. 30, 2001.

Aaron Weiss, XML via the Document Object Model: A Preliminary Course, http://www.wdvl.com/Authoring/Languages/XML/DOM/Intro/, 3 pages, Dec. 21, 1998.

Aaron Weiss, The Document Object Model Dissected, http://www.wdvl.com/Authoring/DHTML/DOM/index.html, 3 pages, Nov. 19, 1998.

Selena Sol, Introduction to the Web Application Development Environment (Tools), http://www.wdvl.com/Authoring/Tools/Tutorial/toc.html, 3 pages, May 31, 1999.

Selena Sol, Introduction to Web Programming, http://www.wdvl.com/Authoring/Scripting/Tutorial/toc.html, 5 pages, Aug. 30, 2001.

Selena Sol, Applet HTML, http://www.wdvl.com/Authoring/Scripting/Tutorial/java_applet_html.html, 4 pages, Aug. 30, 2001.

Selena Sol, Distribution History, http://www.wdvl.com/Authoring/Scripting/Tutorial/java_distribution_history.html, 3 pages, Aug. 30, 2001.

Selena Sol, Network Programming in Java, http://www.wdvl.com/Authoring/Scripting/Tutorial/java_networking.html, 3 pages, Aug. 30, 2001.

Reaz Houqe, Simple Java Scripts, http://www.wdvl.com/Authoring/JavaScript/Simple.html, 3 pages, Aug. 30, 2001.

Nancy Winnick Cluts, DHTML? Applets? Controls? Which To Use? http://www.microsoft.com/technet/treeview/default.asp?url=/TechNet/tcevents/itevents/dhmtlvsc.asp, 6 pages, Feb. 13, 1998.

Nancy Winnick Cluts, All About Scripting, http://msdn.microsoft.com/library/default.asp?url=/workshop/components/activex/intro.asp, 10 pages, No date given.

Dynamic HTML, http://www.microsoft.com/technet/archive/default.asp?url=/TechNet/archive/ie/reskit/ie4/Part6/part6a.asp, 12 pages, No date given.

Java™ Platform 1.2 API Specification, http://www.cs.uidaho.edu/jimaf/java1.2docs/api/overview-summary.html, 5 pages, No date given.

* cited by examiner

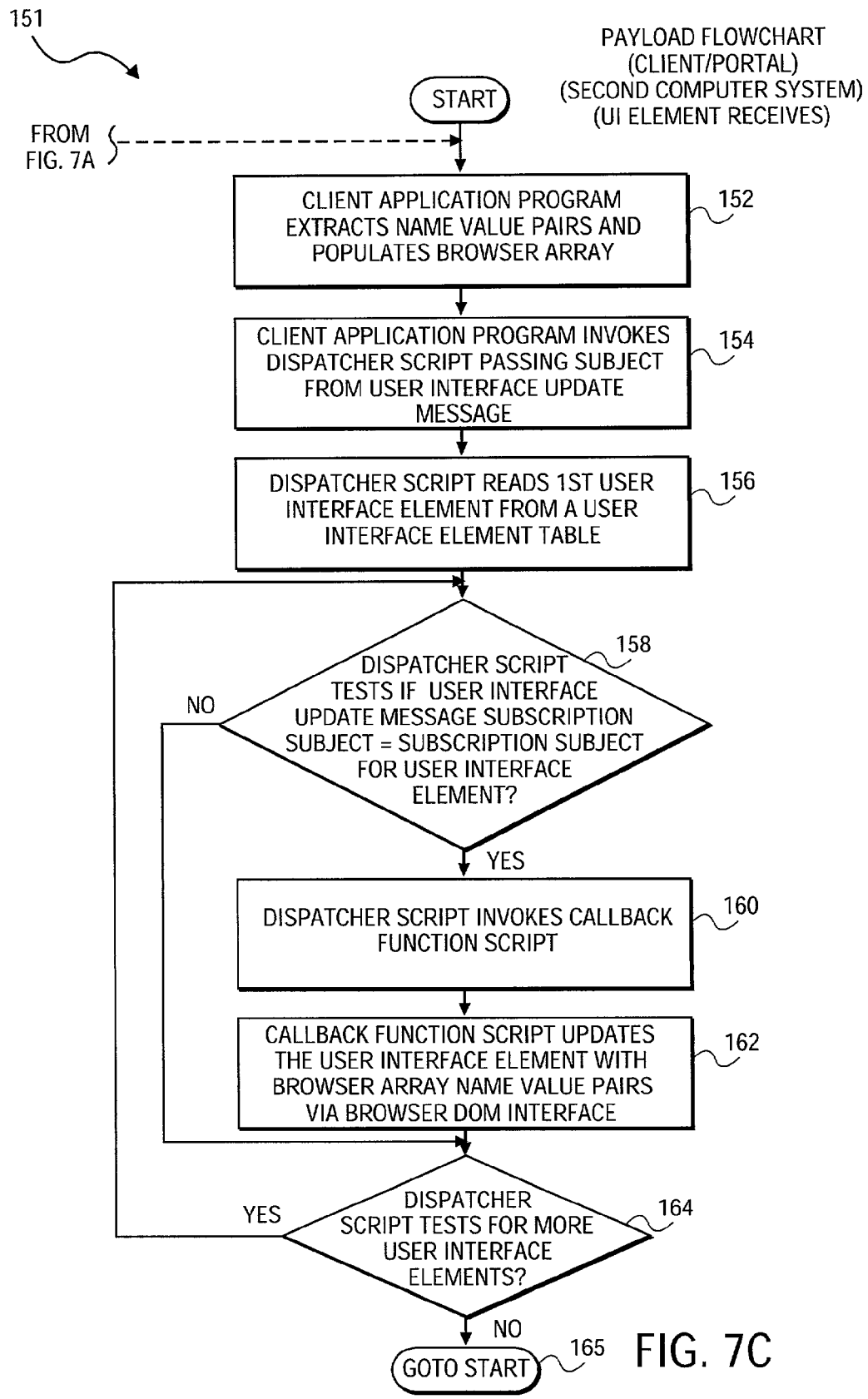

TABLE 1

USER INTERFACE ELEMENT TABLE ~176
(CLIENT/PORTAL)
(SECOND COMPUTER SYSTEM)

|  | SUBSCRIPTION SUBJECTS | CALLBACK FUNCTION |
|---|---|---|
| PER USER INTERFACE ELEMENT |  |  |
|  |  |  |
|  |  |  |
|  |  |  |
|  |  |  |

FIG. 8

TABLE II

BROWSER ARRAY
(CLIENT/PORTAL)
(SECOND COMPUTER SYSTEM)  177

| NAME | VALUE |
|------|-------|
|      |       |
|      |       |
|      |       |
|      |       |
|      |       |

FIG. 9

TABLE III
(SERVER)
(FIRST COMPUTER
SYSTEM)

SUBSCRIPTION SUBJECT TABLE 178

| PER CLIENT/ PORTAL COMPUTER | SUBJECT 1 | SUBJECT 2 | • • • | SUBJECT N |
|---|---|---|---|---|
| | | | | |
| | | | | |
| | | | | |
| | | | | |
| | | | | |

FIG. 10

MESSAGE II

MESSAGE III

SINGLE APPLET TO COMMUNICATE WITH MULTIPLE HTML ELEMENTS CONTAINED INSIDE OF MULTIPLE CATEGORIES ON A PAGE

FIELD OF THE INVENTION

The present invention relates generally to the field of communicating information via a communication network and more specifically, to a method and system for communicating information to and from an object on a screen at a computer, such as a user interface element.

BACKGROUND INFORMATION

The Internet has become an indispensable tool in a short time. A person may, with the click of a mouse, peruse a catalogue, input a VISA number or review a stock quote. Recent technology has enabled developers to create web pages that are dynamic and interactive. For example, screen elements may now be made to rotate; accept input; or scroll headlines. A technology often used to create dynamic web pages is so called "applet technology" that allows for the creation of so called "applets".

An applet is a program that is written in the Java™ programming language and that can be included in a web page, much in the same way an image or other object is included. When a user uses a Java technology-enabled browser to view a page that contains an applet, the applet's code is transferred to the user's system from a server and executed by the browser's Java Virtual Machine (JVM).

Java applets are used in different ways to deliver a dynamic web experience. For example, an applet may display an image that rotates around another image. In another example, an applet might display a form for inputting a VISA card number to complete the purchase of an item. In general, a developer will write an applet to create dynamic and interactive web pages because the language commonly used to create web pages, HTML, lacks the necessary power and capability to provide such functionality.

An applet may also provide for a real time screen update of a screen element. A screen element capable of a real time screen update will change automatically without refreshing by the user and without the client computer system polling the server computer system. This is done with a point-to-point connection from the client applet back to a program that runs on the server. Real time screen updates are attractive to users that need current and reliable information on a moments notice. For example, a stockbroker involved in heavy trading would appreciate a NYSE stock quote that updates without requiring manual refreshing of the screen.

An applet is typically downloaded from a server computer system to a client computer system. This download may be problematic and time consuming when an excessively large applet or an excessively large number of applets are associated with a web page. Such web pages may require extended periods of time to download because of bandwidth limitations on the link between the server and the client. Frustrated users often give up waiting and go to another web site.

SUMMARY OF INVENTION

A method to facilitate the update of a plurality of user interface categories utilizing a single client application program, the method including: at a first computer system, generating a user interface data message wherein the user interface data message includes the plurality of user interface categories and the single client application program, wherein the single client application program executes at a second computer system, wherein each user interface category includes a user interface element; communicating the user interface data message from the first computer system to the second computer system; receiving a user interface update message, at the first computer system, wherein the user interface update message includes an update to the plurality of user interface categories; and communicating the user interface update message from the first computer system to the second computer system to enable the single client application program, at the second computer system, to update the plurality of user interface categories.

A method to facilitate receiving a user interface update from a plurality of user interface categories utilizing a single client application program, the method including: at a first computer system, generating a user interface data message wherein the user interface data message includes the plurality of user interface categories and the single client application program, wherein the single client application program executes at a second computer system, wherein each user interface category includes a user interface element; communicating the user interface data message from the first computer system to the second computer system; and at the first computer system, receiving a user interface update message from the second computer system, wherein the user interface update message is generated at the second computer system by the user interface element that communicates a user interface update to the single client application program, the single client application program communicating the user interface update message to the first computer system.

BRIEF DESCRIPTION OF THE DRAWINGS

The present invention is illustrated by way of example and not limitation in the figures of the accompanying drawings, in which like references indicate similar elements and in which:

FIG. 7C is a flow chart illustrating an exemplary method of updating a plurality of user interface categories utilizing a single client application program where the user interface categories receive an update from the single client application program.

FIG. 8 is a diagram illustrating an exemplary user interface element table.

FIG. 9 is a diagram illustrating an exemplary browser array.

FIG. 10 is a diagram illustrating an exemplary subscription subject table.

DETAILED DESCRIPTION

A method and system for facilitating the update of a plurality of user interface categories utilizing a single client application program are described. In the following description, for purposes of explanation, numerous specific details are set forth in order to provide a thorough understanding of the present invention. It will be evident, however, to one skilled in the art that the present invention may be practiced without these specific details.

Reference is made to a "category" of screen elements. The word "category" may be used interchangeably with the terms "content type" or "aggregate area", and for purposes of the present specification is deemed to refer to an identifiable group or collection of screen (or user interface) elements of a screen or user interface (UI). Within a category, a single applet may for example manipulate screen elements to convey or capture information. In addition, on a screen with multiple categories, a single applet may service a single screen category. Thus, a category may for example be limited to a particular area on the web page, devoted to a particular content type and controlled by a single applet.

Messaging Infrastructure for Distributed and Diverse Applications

Figure 1:
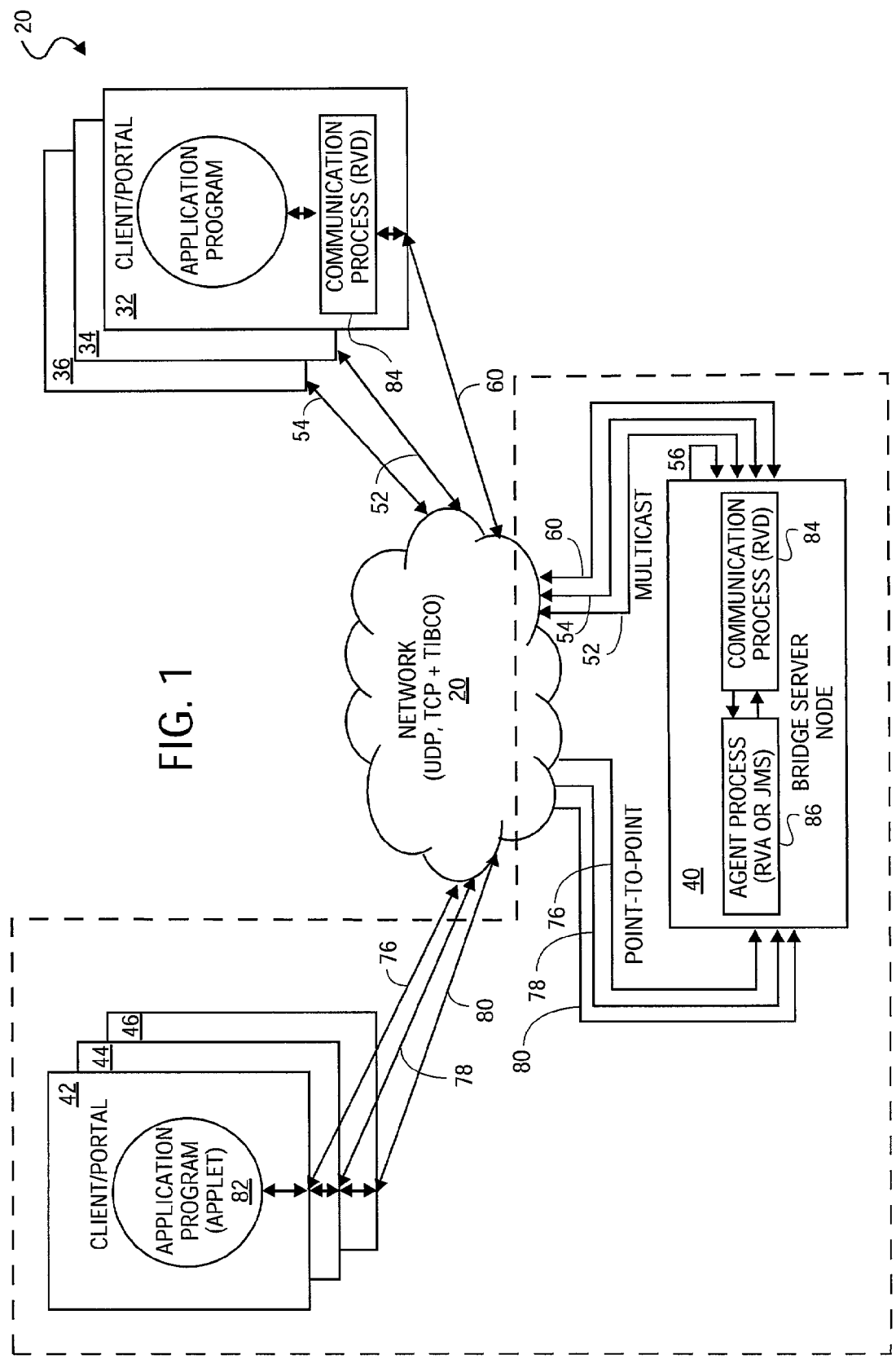
FIG. 1 is a block diagram illustrating an exemplary system for updating a plurality of user interface categories in the form of a messaging infrastructure for distributed and diverse applications as implemented over a network.

FIG. 1 illustrates a system, according to an exemplary embodiment of the present invention, in the form of a messaging infrastructure for distributed and diverse applications. For example, the messaging infrastructure for distributed and diverse applications may be embodied as the TIBCO ActiveEnterprise™, a middleware or Enterprise Application Integration (EAI) product, developed by Tibco Software, Inc. Palo Alto, Calif. FIG. 1 further illustrates an exemplary first computer system in the form of a bridge node computer 40; an exemplary second computer system in the form of a portal computer 42, 44 or 46 (a portal computer may for example be a computer that transmits messages for multicasting into the messaging infrastructure and/or receives multicasted messages from the messaging infrastructure); and an exemplary third computer system in the form of a portal computer 32, 34 and 36.

The messaging infrastructure includes a communication network 20 comprised of computers 32, 34, 36, 42, 44 and 46 coupled for communication over a set of communication connections 52, 54, 56, 60, 76, 78 and 80. In one embodiment, each connection comprises a type of Internet connection/layer such as Transport Control Protocol TCP, Hypertext Transport Protocol (HTTP), Simple Object Access Protocol (SOAP), etc.

Each computer is a portal computer 32, 34, 36, 42, 44 or 46 or a node computer 40 and under pre-configured conditions is connected to another computer in the network 20. Computers may be connected together with a point-to-point connection 76, 78 or 80 or a multicast connection 52, 54, 56, 60, 76, 78 and 80.

The portal computers 32, 34, 36, 42, 44 and 46 are endpoints of the messaging infrastructure and transmit or receive information that is transported by the messaging infrastructure. In one embodiment, a database application program at portal computer 32 may transmit and/or receive information to or from the messaging infrastructure. In another embodiment, users operating portal computers 32, 34, 36, 42, 44 and 46 transmit and/or receive information via screen user interface elements 88. Entry of information, in either embodiment, results in the generation of a user interface update message that is published to the messaging infrastructure with respect to a particular subject. Receipt of information at a portal computer 32, 34, 36, 42, 44 and 46 results from the reception of a user interface update message that is identified by a subject that is listened or subscribed to by the portal computer 32, 34, 36, 42, 44 and 46. To be clear, portal computers 32, 34, 36, 42, 44 and 46 both send and receive the user interface update message 94.

Figure 2:
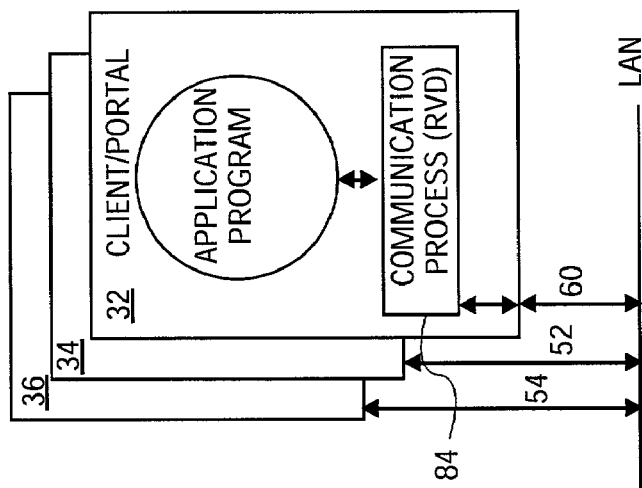
FIG. 2 is a block diagram illustrating an exemplary system for updating a plurality of user interface categories in the form of a messaging infrastructure for distributed and diverse applications as implemented over a local area network (LAN).
Figure 2:
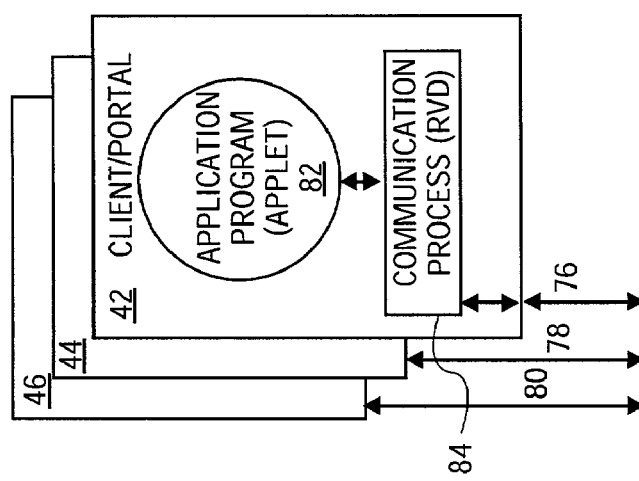

The portal computers 42, 44 and 46 differ from the portal computers 32, 34 and 36 in the following ways. The portal computers 42, 44 and 46 exemplify the operation of a portal computer in the messaging infrastructure for diverse and distributed applications. In contrast the portal computers 32, 34 and 36 exemplify the operation of a portal computer in the messaging infrastructure for diverse and distributed applications without the invention. To this end, portal computers 42, 44 and 46 differ from portal computers 32, 34 and 36 by not hosting a communication process 84. Communication process 84 provides multicasting functionality for the messaging infrastructure for diverse and distributed applications. Multicasting functionality for portal computers 42, 44 and 46 is localized at the bridge node computer 40. However, where the messaging infrastructure is embodied as a LAN, as depicted in FIG. 2, note that portal computers 42, 44 and 46 operate without communicating via an agent process 86 and, in contrast to the network embodiment, host a communication process 84.

Turning back to FIG. 1, the bridge node computer 40 is an intermediate node through which user interface update messages are communicated to and from portal computers 32, 34, 36, 42, 44 and 46. Thus, the bridge node computer 40 facilitates bi-directional communication between the portal computers 32, 34, 36, 42, 44 and 46. Also note that a messaging infrastructure may have one or multiple bridge node computers as required to support the configured number of client/portal computers.

The portal computers 32, 34, 36, 42, 44 and 46 are connected to the bridge node computer 40 with the multicast connections 52, 54, 56 and 60 and point-to-point connections 76, 78 and 80, respectively. The multicast connections 52, 54, 56 and 60 are established only so long as necessary for communication and are then terminated. The point-to-point connections 76, 78 and 80 are established as long as a display with the user interface element[s] 88 (see FIG. 3) appears on the screen of the respective portal computer 42, 44 and 46. The point-to-point connection, 76, 78 or 80, is terminated when the display is changed by the user or the connection times out.

Bridge Node Computer and Portal Computers

Referring back to FIG. 1, portal computer 42, 44 or 46 connects to the bridge node computer 40 when a user selects a web page that contains user interface elements capable of sending and/or receiving user interface update messages over the messaging infrastructure. The portal computer 42, 44 or 46 disconnect from the bridge node computer 40 when a user selects a web page without the user interface elements 88 (FIG. 3) capable of sending and/or receiving user interface elements 88 or the connection times out. The point-to-point connections facilitate communication of the user interface update messages 94 to the portal computers 42, 44 and 46 without polling by the portal computers 42, 44 and 46 and without the user refreshing the web page. Thus, the point-to-point connections 76, 78 and 80 facilitate real-time updates to and from the user interface elements 88 at the portal computer 42, 44 and 46. This contrasts with conventional client-server architecture where the client computer typically initiates an update of the web page.

At the bridge node computer 40 and at each of the portal computers 32, 34, and 36 is a communication process 84 that provides a messaging interface between the client application program 82 at portal computers 32, 34 and 36 and the agent process 86 at the bridge node computer 40. The communication process 86 at the bridge node computer 40 receives the user interface update messages 94 from the messaging infrastructure and sends the user interface update messages 94 to the agent process 86 at the bridge node computer 40. The agent process 86 at the bridge node 40 communicates the user interface update message 94 to the application program at the portal computers 42, 44 and 46, provided the respective portal computer 42, 44 or 46 listens or subscribes to the subject of the user interface update message 94. Conversely, the user interface update message 94 may be communicated in the reverse direction originating from a user interface element 88 at any of port computers 42, 44 or 46 and transmitted by the client application program to the agent process 86 at the bridge node computer 40. Finally, the agent process 86 at the bridge node computer 40 communicates the user interface update message 94 to the communication process 84 that, in turn, multicasts the user interface update message 94 into the messaging infrastructure. Multicasting into the messaging infrastructure requires the bridge node computer 40 (or any other computer that hosts a communication process 84) to form a multicast connection with every other portal or nodal computer that hosts a communication process 84. The user interface update message 94 is transmitted over the multicast connection 52, 54, 56 or 60 and the multicast connection is disconnected.

The communication process 84 may be embodied as a TIBCO Rendezvous™ Daemon (RVD) and the agent process 86 may be embodied as a TIBCO Rendezvous™ Agent (RVA) or a Java Messaging Service (JMS) Server using push message technology. For example, both the RVD and RVA processes operate in the TIBCO ActiveEnterprise™ product, a messaging infrastructure that interfaces diverse application programs running on diverse computer platforms. The TIBCO Rendezvous™ Daemon, TIBCO Rendezvous™ Agent, and the TIBCO ActiveEnterprise™ product are developed by Tibco Software, Inc. Palo Alto, Calif.

At each of the portal computers 42, 44 and 46 is illustrated an exemplary single client application program 82. The client application program 82 at each of the portal computers 42, 44 and 46 is connected to the agent process 86 at the bridge node computer 40 with the point-to-point connections 76, 78, and 80 that provide a bi-directional connection for communication of the user interface update message 94. For example, the client application program 82 may be embodied as a Java applet, Java program, browser plug-in or a Microsoft (MS) COM object that updates and services user interface elements, HTML elements on the web page. Alternate embodiments of DOM interfaces are embodied in Netscape Navigator or Microsoft Explorer browsers.

Messaging

Figure 3:
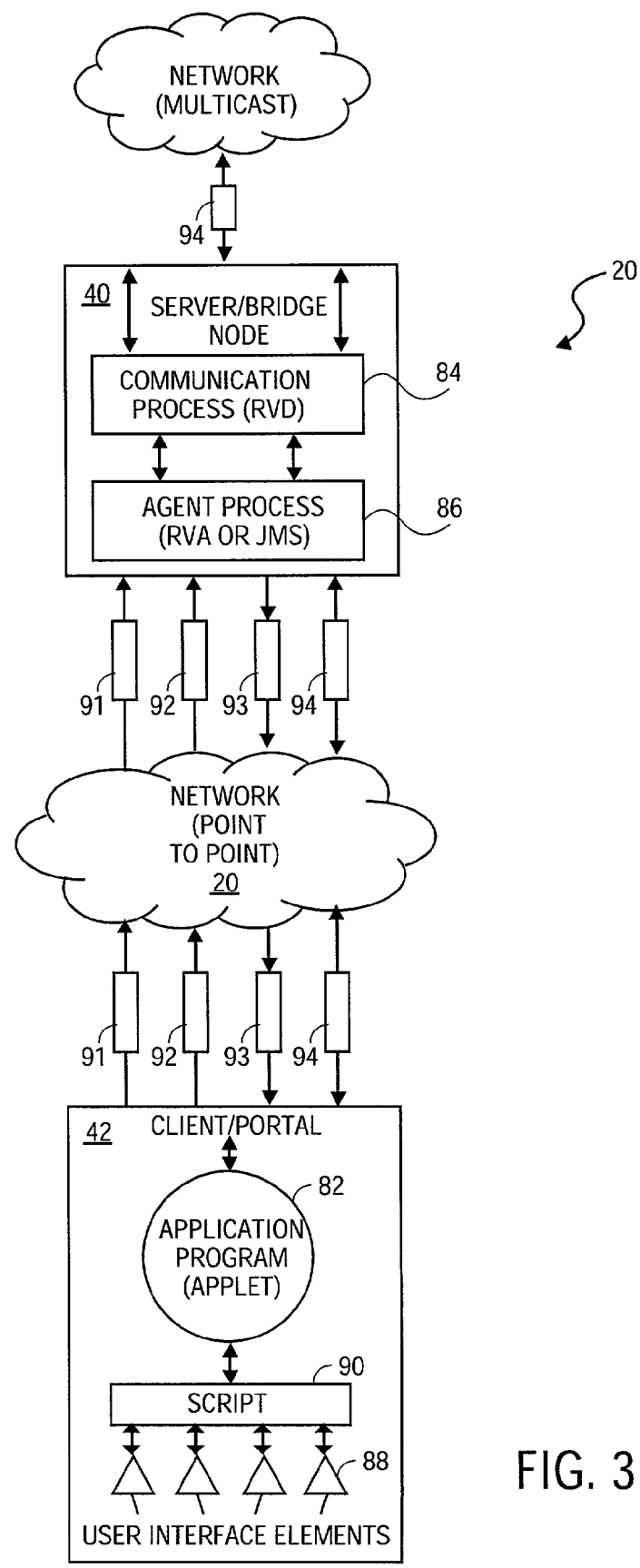
FIG. 3 is a block diagram illustrating selected messaging between a bridge node computer and portal computers.

FIG. 3 is a block diagram illustrating exemplary selected messaging between a bridge node computer 40 and a single portal computer 42. The messages include an exemplary user interface data message 93; an exemplary user interface update originating from a user interface element; an exemplary user interface update message 94; a request for connection 91; a subscription subject message 92, an exemplary communication process 84 and an exemplary agent process 86. FIG. 3 further illustrates an exemplary script 90 and an exemplary user interface elements 88.

Communication of the various messages 91, 92, and 93 result in the construction of a web page at the portal computer 42; this process is referred to as a "page build" in subsequent flow charts. In addition, communication of the user interface update message 94 may originate from a user interface element 88 and result in the update of the user interface elements 88 on a web page at any portal computer 32, 34, 36, 42, 44 or 46; this process is referred to as "payload" in subsequent flow charts.

A brief description of an exemplary page build process follows. At the portal computer 42, a user selects a URL identifying a web page that contains the user interface elements 88 supported by the messaging infrastructure. This results in the agent process 86 at bridge node computer 40 generating and sending a user interface data message 93 that contains component parts (see FIG. 11) of the web page, including the client application program. Upon receipt of the user interface data message 93, the portal computer 42 displays the web page and invokes the client application program that sends a request for connection 91 and the subscription subject message 92 to the agent process 86 at the bridge node computer 40.

A description of an exemplary payload process follows. A user interface update originates from a user interface element 88 at a portal computer 32, 34 or 36 or 42, 44 or 46 and is multicast, as a user interface update message 94, throughout the messaging infrastructure. The communication process 84 at the bridge node computer 40 receives the user interface update message 94 and communicates the user interface update message 94 to the agent process 86 in the bridge node computer 40. The agent process 86 communicates the user interface update message 94 to the single client application program 82 at the portal computer 42, provided that the portal computer 42 listens or subscribes to the subject that is designated in the user interface update message 94.

The user interface update message 94 may also be communicated in the opposite direction. A user interface element 88 communicates an update to a script 90 at the portal computer 42. The script 90 communicates the update to a single client application program 82. The single client application program 82 communicates the use interface update message 94 to the agent process 86 at the bridge node computer 40. The agent process 86 communicates the user interface update message 94 to the communication process at the bridge node computer 40. The communication process 84 multicasts the user interface update message 94 into the messaging infrastructure. Thus, the user interface update message 94 is communicated bi-directionally between the bridge node computer 40 and the portal computer 42 with the user interface update message 94.

Browser and Components

Figure 4:
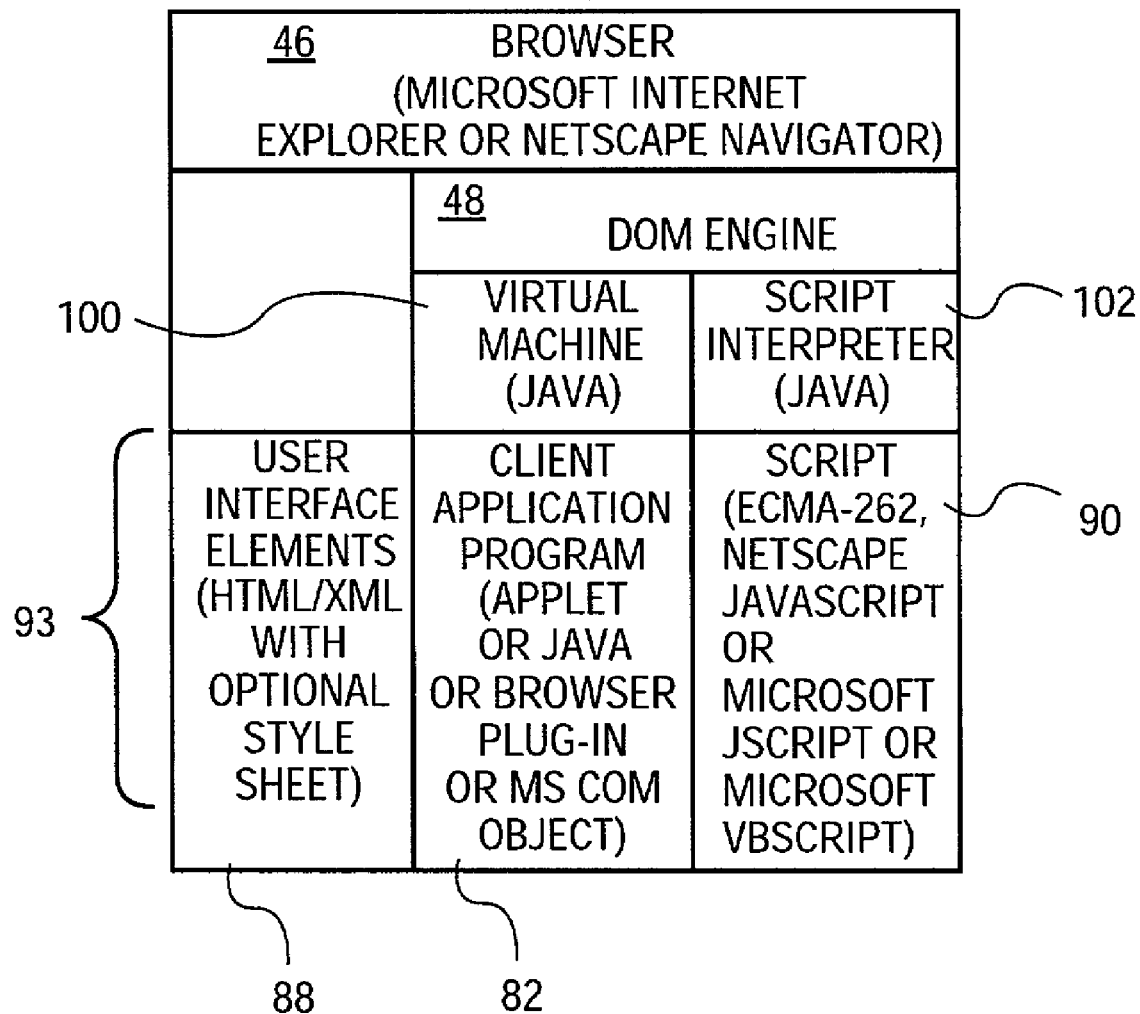
FIG. 4 is a diagram illustrating a number of exemplary software components for accessing the world-wide-web from a portal computer.

FIG. 4 is a diagram illustrating a number of exemplary software components for accessing the world-wide-web from portal (client) computer 42 according to one embodiment of the present invention.

FIG. 4 illustrates an exemplary browser 96 that executes at the client computer 42 and enables a user to display web pages that are loaded from server computers using the world-wide-web architecture. The browser 96 may be the Microsoft Internet Explorer developed by Microsoft™ Corporation of Richmond, Wash. or Navigator™ developed by Netscape of Mountain View, Calif. The browser 96 executes under an operating system that may be the Microsoft™ Windows developed by Microsoft™ Corporation or Mac OS X developed by Apple Computers of Cupertino, Calif.

FIG. 4 further illustrates an exemplary Display Object Model (DOM) Engine 98 with an application-programming interface (API) to manipulate HTML screen objects, which are examples of user interface elements 88. For example, a user interface element 88 may be a graphical image or a form that permits a user to input alphanumeric data, text, etc. The DOM API provides the ability to rotate a graphical image, change the color of text, the background of a web page, etc. The DOM API provides access for manipulation of the user interface elements 88 by various software components including a script 90 and a client application program 82 that invoke methods through the DOM API. In conjunction with an optional style sheet and a HTML web page, a DOM API provides the ability for the scripts 90 and the client application programs 82 to make web pages highly interactive and dynamic. The combination of browser, application programs, scripts and style sheets to create a highly dynamic web page is sometimes referred to as Dynamic HTML or DHTML. In addition, access to user interface elements 88 with the browser 96 DOM interface is bi-directional; thus, software components such as the script 90 or the client application program 82 may write to or read from the user interface elements 88.

FIG. 4 further illustrates an exemplary Java Virtual Machine 100 that translates applications written in Java bytecodes on the fly to native machine instructions (interpreted). Thus, Java Virtual Machine 100, a browser plug-in, permits a software developer to write an application in Java bytecodes that is executable on a wide variety of computer platforms. This architecture is highly desirable for executing application programs in a network composed of many computer platforms such as the Internet.

FIG. 4 further illustrates exemplary software components that are delivered to the browser 96 as a web page. Software components may include: user interface elements 88 with the optional style sheets 88; a single client application program 82; and, an exemplary script 90. Components are delivered to the portal computer 42 in the user interface data message 93 and are sent by the bridge node computer 40 when a user at the portal computer 42 requests the web page.

Executing under the browser 96 is the single client application program 82. The client application program 82 interacts on one side with the agent process 86 and on the other side with the script 90. The client application program 82 receives the user interface update message 94 from the agent process 86 and passes it to the script 90 thereby facilitating the update of user interface elements. Communication of the user interface update message 94 is also performed in the reverse direction. Note that a single client application program is utilized to update multiple user interface categories containing user interface elements (e.g., all screen categories) on the web page. As practiced without the invention, a client application program is dedicated to a particular user interface category thus requiring multiple client application programs to service multiple user interface categories. The client application program 82 is written in Java bytecodes and interpreted by Java Virtual Machine 100. The client application program 82 may be embodied as a Java applet or Java code.

Executing under the browser 96 and browser script interpreter 102 is the script 90. The script 90 is a list of commands that can be executed without user interaction and that implement comparatively simple functions when compared with a full application programming language.

The script 90 is identified in an exemplary embodiment as the callback function script 90, a dispatcher script 90 and a general-purpose script 90. Individual callback function scripts 90 are dedicated to servicing particular user interface categories containing user interface elements 88; the dispatcher script 90 interfaces with the client application program 82 and the callback function script 90; and the general-purpose script 90 performs general-purpose script functions not performed by the callback function script 90 or the dispatcher script 90.

The callback function script 90 receives the user interface update message 94 from the client application program 94 and updates the user interface elements 88 through the API of the DOM Engine 98 of the browser 96. Communication of the user interface update message 94 is also performed in the reverse direction.

The callback function script 90 and the script 90 may be embodied as Netscape Javascript or Microsoft JScript or Microsoft VBScript or ECMA-262 compliant script.

FIG. 4 further illustrates a plurality of exemplary user interface elements 88. The user interface elements 88 define the appearance of HTML elements on a web page as displayed on the screen of the portal computer 42. The user interface elements 88 may be embodied in meta-languages such as HTML, XML, SGML, etc. and may be stylized with the optional style sheets 88. The style sheets may provide additional attributes to text such as font style, font size, italics, color, etc. and may be embodied as cascading style sheets.

Figure 5:
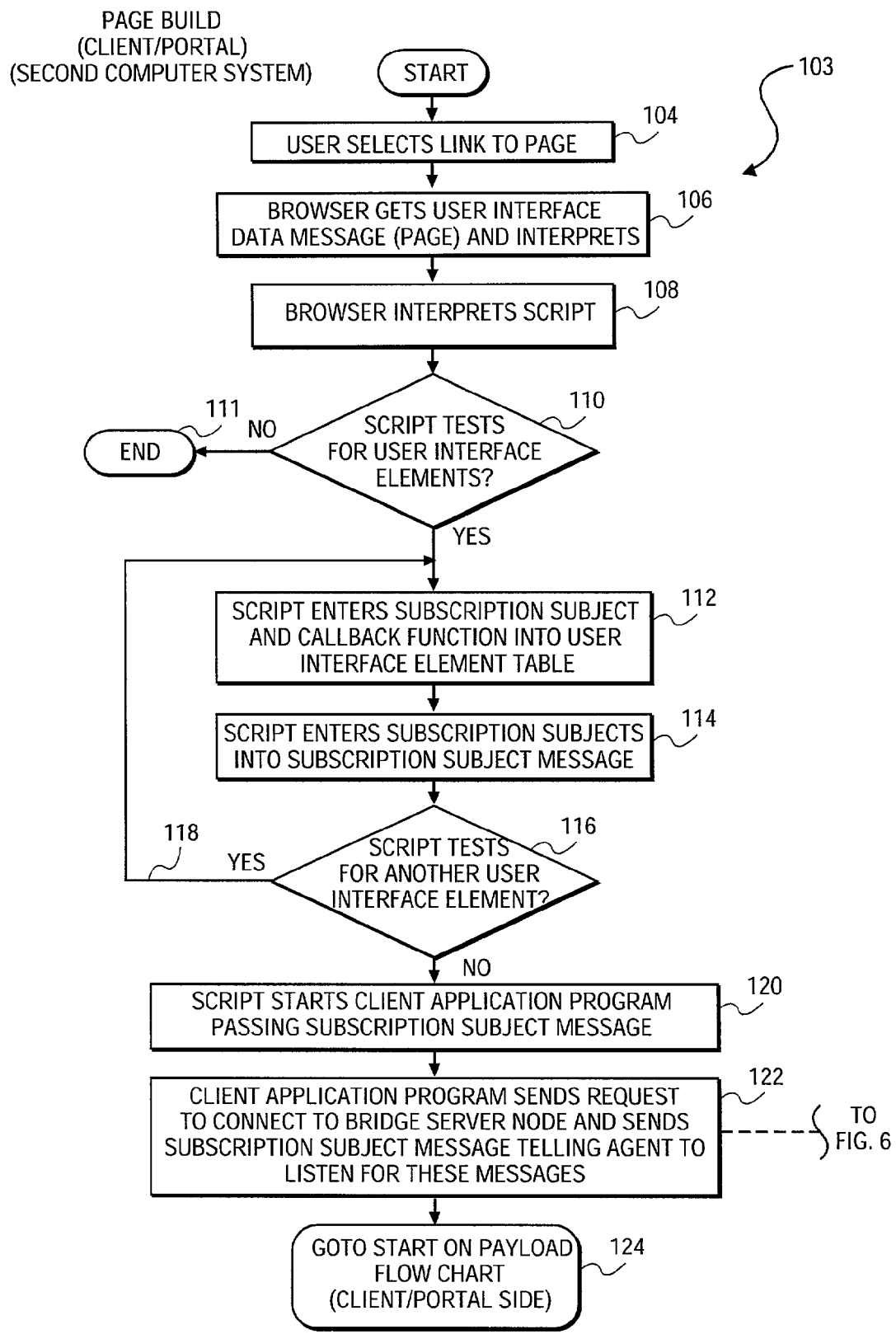
FIG. 5 is a flow chart illustrating an exemplary (web) page build processing at a second computer system in the form of a portal (client) computer.

Single Applet Communicating with Multiple HTML Elements Contained inside of Multiple Categories Page Build—Client Side FIG. 5 is a flow chart illustrating an exemplary (web) page build processing at an exemplary second computer system in the form of a portal (client) computer 42.

Figure 14:
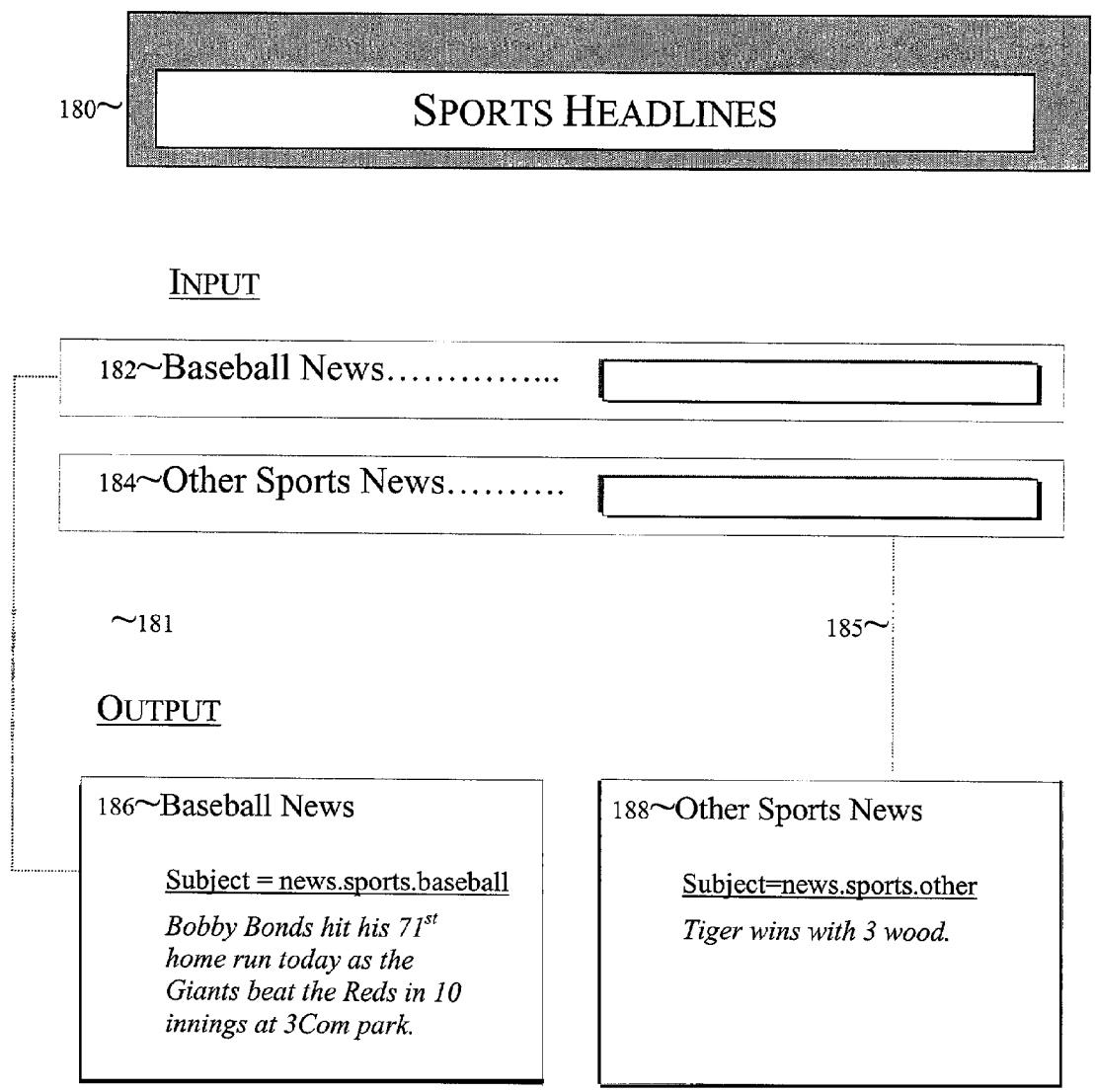
FIG. 14 is a mock up user interface in the form of a web page titled Sports Headlines illustrating exemplary user interface elements in the form of HTML elements and exemplary user interface categories in the form of screen categories that contain the HTML elements.

At box 104, a user, sitting in front of the client computer 42, requests a screen that includes the user interface elements 88, for example as illustrated in FIG. 14. In one embodiment the request takes the form of a message that is communicated over the Internet to a server computer. The request may also take the form of a frame that is communicated over a LAN or a packet that is communicated over a bus.

At box 106, the browser 96 receives a user interface data message 93. The user interface data message 93 includes the user interface elements 88 with optional style sheets 88, the single client application program 82, and the script 90.

At box 108, browser 96 copies the script 90 out of the user interface data message 93 into memory and invokes the script interpreter 102 to interpret the script 90.

At decision box 110, the script 90 determines if the user interface data message 93 includes a user interface element 88. If not, then the script 90 stops at box 111. Otherwise at box 112 the script 90 copies subscription subjects associated with a found user interface element 88 from the user interface data message 93 into a user interface element table 176. At box 114, the script 90 copies the same subjects into the subscription subject message 92. At decision box 116, the script 90 tests for another user interface element 88. The above loop (box 112, 114 and decision box 116) iterates until all the user interface elements 88 are processed.

At box 120, the script 90 invokes the client application program 82 and passes the subscription subject message 92 previously created in box 114. The subscription subject message 92 represents a complete list of subscription subjects subscribed to by the user interface elements 88 on the web page.

At box 122, the client application program 82 sends a request for a connection 91 and the subscription subject message 92 to the agent process 86 at the bridge node 40 (server).

At box 124, web page building is complete. Processing at the client computer continues on FIG. 7B.

Page Build—Server Side—Agent Process

Figure 6:
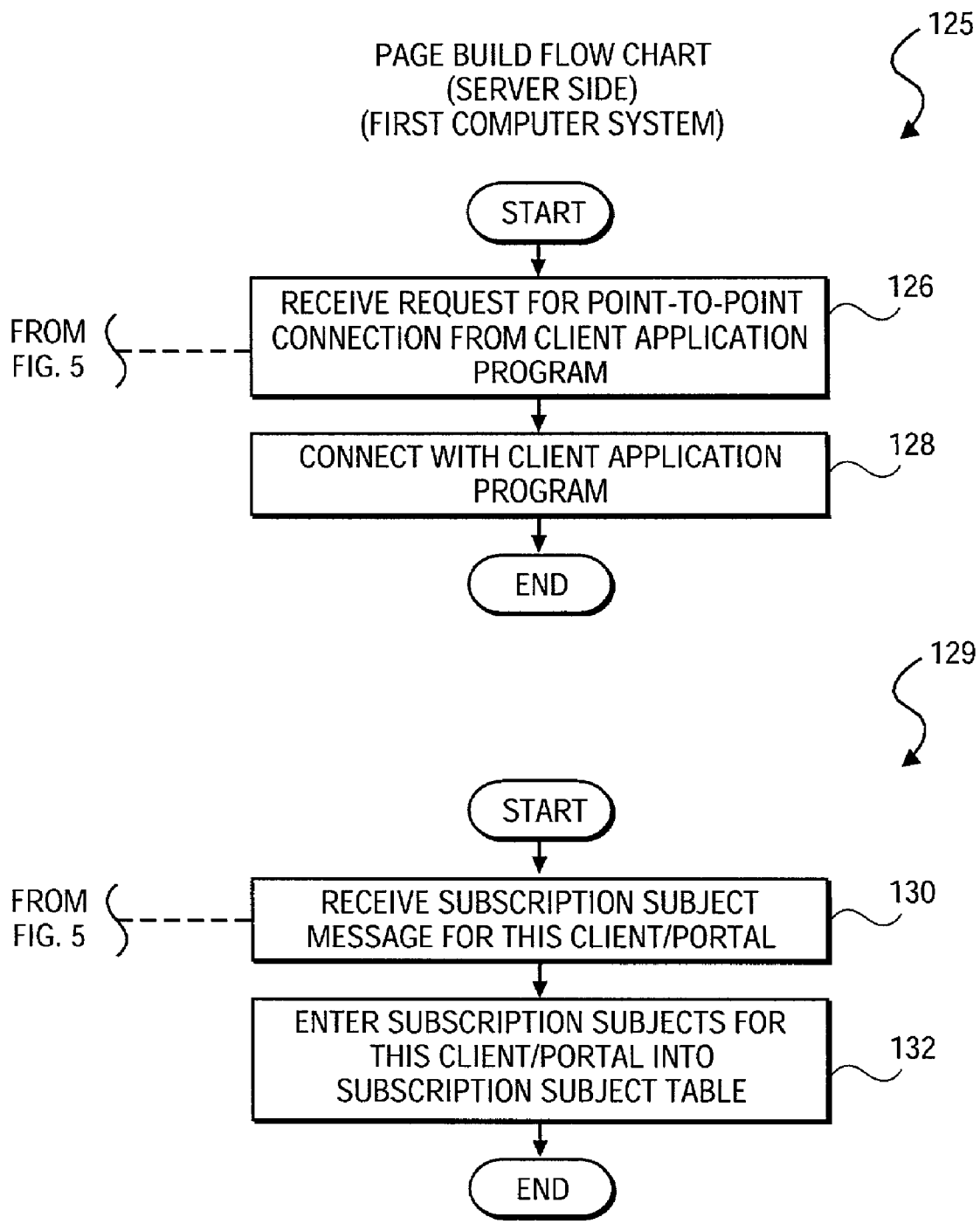
FIG. 6 is a flow chart illustrating an exemplary (web) page build processing by an agent process at a first computer system in the form of bridge node (server) computer.

FIG. 6 is a flow chart illustrating an exemplary (web) page build processing by the agent process 125 and 129 at an exemplary first computer system in the form of the bridge node (server) computer 40. At the server computer 40 the agent process 86 performs the following processing.

At box 126, the agent process 86 at the server computer 40 receives a request to establish a connection 91.

At box 128, the agent process 86 establishes the point-to-point connection 70 with the client computer 42.

At box 130, the agent process 86 receives the subscription subject message 92 that includes a complete list of subscription subjects subscribed to by all the user interface elements 88 currently displayed at client the computer 42. At box 132, the agent process 86 enters the list of subscription subjects for the client computer 42 into the subscription subject table 178 that is maintained at the server computer 40.

Pay Load—Server Side—Agent Process

Figure 7A:
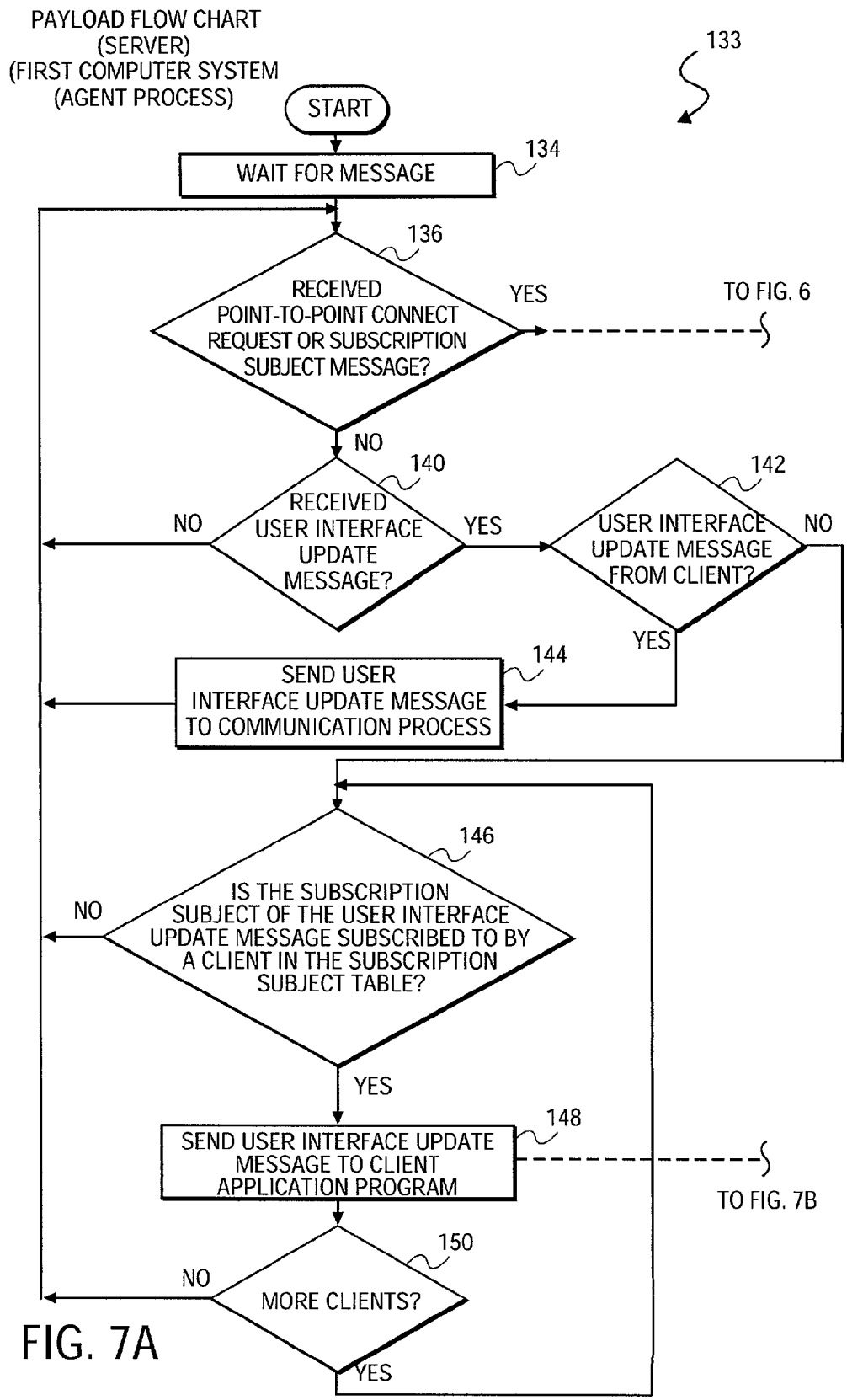
FIG. 7A is a flow chart illustrating an exemplary (web) payload processing by an agent process at a first computer system in the form of a bridge node (server) computer.

FIG. 7A is a flow chart illustrating exemplary (web) payload processing by the agent process 133 at an exemplary first computer system in the form of a bridge node (server) computer 40. At the server computer 40 the agent process 86 performs the following processing.

At box 134, the agent process 86 waits for a message from the communication process executing at the bridge node (server) computer 40 or client computers 42, 44 or 46. At decision box 136, a test is made to determine if a point-to-point connection request 91 or a subscription subject message 92 has arrived. If message 91 or 92 has arrived, processing resumes as illustrated in FIG. 6. Otherwise the agent process 86 branches to decision box 140.

At decision box 140, a determination is made as to whether a user interface update message 94 is received. The agent process 86 branches to decision box 142 if the user interface update message 94 is received. Otherwise the agent process 86 branches to box 134 to wait for another message.

At decision box 142, a determination is made as to whether the user interface update message 94 was received from a client computer 42, 44 or 46 or from the communication process 84. The agent process branches to box 144 if the user interface update message 94 was received from a client computer 42, 44 or 46. Otherwise the agent process branches to decision box 146.

At box 144, the agent process sends the user interface update message 94 to the communication process and then goes to box 134 to wait for another message.

At decision box 146, the agent process 86 extracts the subject from the user interface update message 94 and compares it with subjects listened or subscribed to by each client computer 42, 44 or 46 as indicated by the respective client computer entry in the subscription subject table 178, shown in FIG. 10. A subject match results in a branch to box 148. Otherwise a branch is made to box 134 to wait for another message.

At box 148, the agent process 86 sends the user interface update message 94 to appropriate client computer 42, 44 or 46.

At decision box 150, the agent process 86 branches to decision box 146 if additional clients exist. Otherwise the agent process 86 branches to box 134 and waits for a message.

Payload—Server Side—Communication Process

Figure 7B:
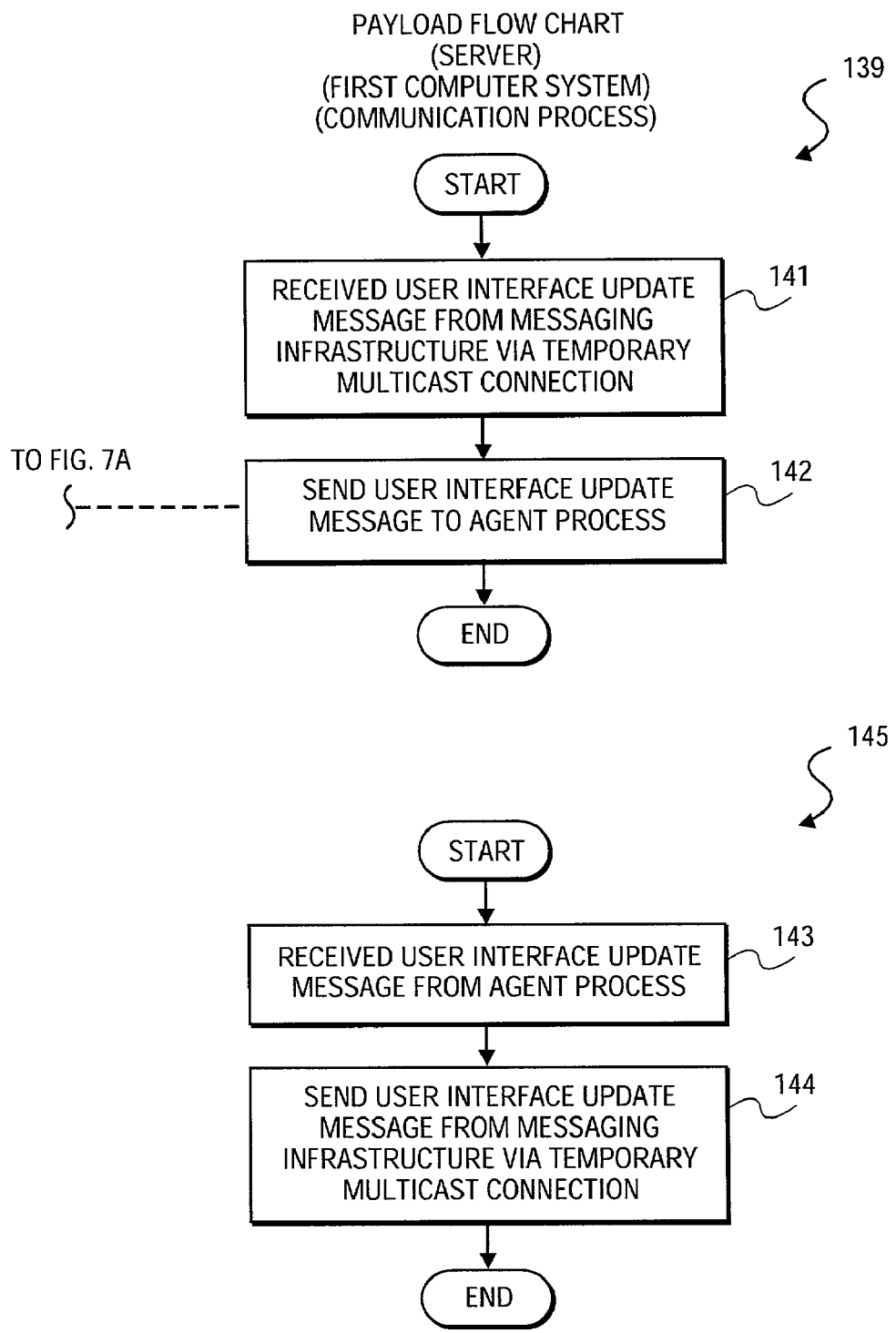
FIG. 7B is a flow chart illustrating an exemplary (web) payload processing by a communication process at an exemplary first computer system in the form of a bridge node (server) computer.

FIG. 7B is a flow chart illustrating exemplary (web) payload processing by the communication process, 139 and 145, at an exemplary first computer system in the form of a bridge node (server) computer 40. At the server computer 40, the communication process 84 performs the following processing.

At box 141, the communication process 84 at the server computer 40 receives a user interface update message 94 from the messaging infrastructure. The message originated from the client portal computer 32, 34, 36, 42, 44, or 46. At box 142, the communication process 84 at the server computer 40 sends the user interface update message 94 to the agent process 86 at the server computer 40.

At box 143, the communication process 84 at the server computer 42 receives a user interface update message 94 from the agent process 86. The message originated from a client portal computer 42, 44 or 46 and arrived at the server computer 42 via a point-to-point connection 70–74. At box 144, the communication process 84 at the server computer 40 multicasts the user interface update message 94 into the messaging infrastructure via multicast connections 52, 54, 56 and 60. Note that the communication process 84 both sources and sinks user interface message 94 over the multicast connection 56. Thus, the client portal computer that originates the user interface update message 94 may also receive the same user interface update message 94 provided that the client portal computer listens for the subject of the user interface update message 94.

Pay Load—Client Side—User Interface Element Receives Update

FIG. 7C is a flow chart illustrating an exemplary (web) payload process 151 where a user interface element 88, contained within a user interface category, receives an update from the script 90 at an exemplary second computer system in the form of a portal (client) computer 42 and an exemplary user interface update in the form of processing at box 162.

At box 152, the client application program 82 receives a user interface update message 94 from the server computer 40 (depicted as dashed line from FIG. 7A); extracts the name value pairs from the message; and, populates the browser array 177 with the name value pairs. At box 154, the client application program 82 invokes the dispatcher script 90 passing the subject that was extracted from the user interface update message 94.

At box 156, the dispatcher script 90 reads the first user interface element entry 88 from the user interface element table 176 and at decision box 158 compares the subject of the user interface update message 94 with the subject of the user interface element entry 88. If the subject of an entry matches the subject of the message, then processing continues at box 160. Otherwise a branch is made to decision box 164.

At box 160, the dispatcher script 90 invokes the callback function script 90 to update a specific user interface element 88. At box 162, the callback function script 90 extracts name value pairs from the browser array 177 and passes them to a method as provided by the DOM interface API 98 of the browser 96 whereby the user interface element 88 is updated. Execution resumes at decision box 164.

At decision box 164, the dispatcher script 90 tests for another user interface element 88 entry in the user interface element table 176. If another entry exists then processing continues at decision box 158. Otherwise processing stops at box 165.

Pay Load—Client Side—User Interface Element Sends Update

Figure 7D:
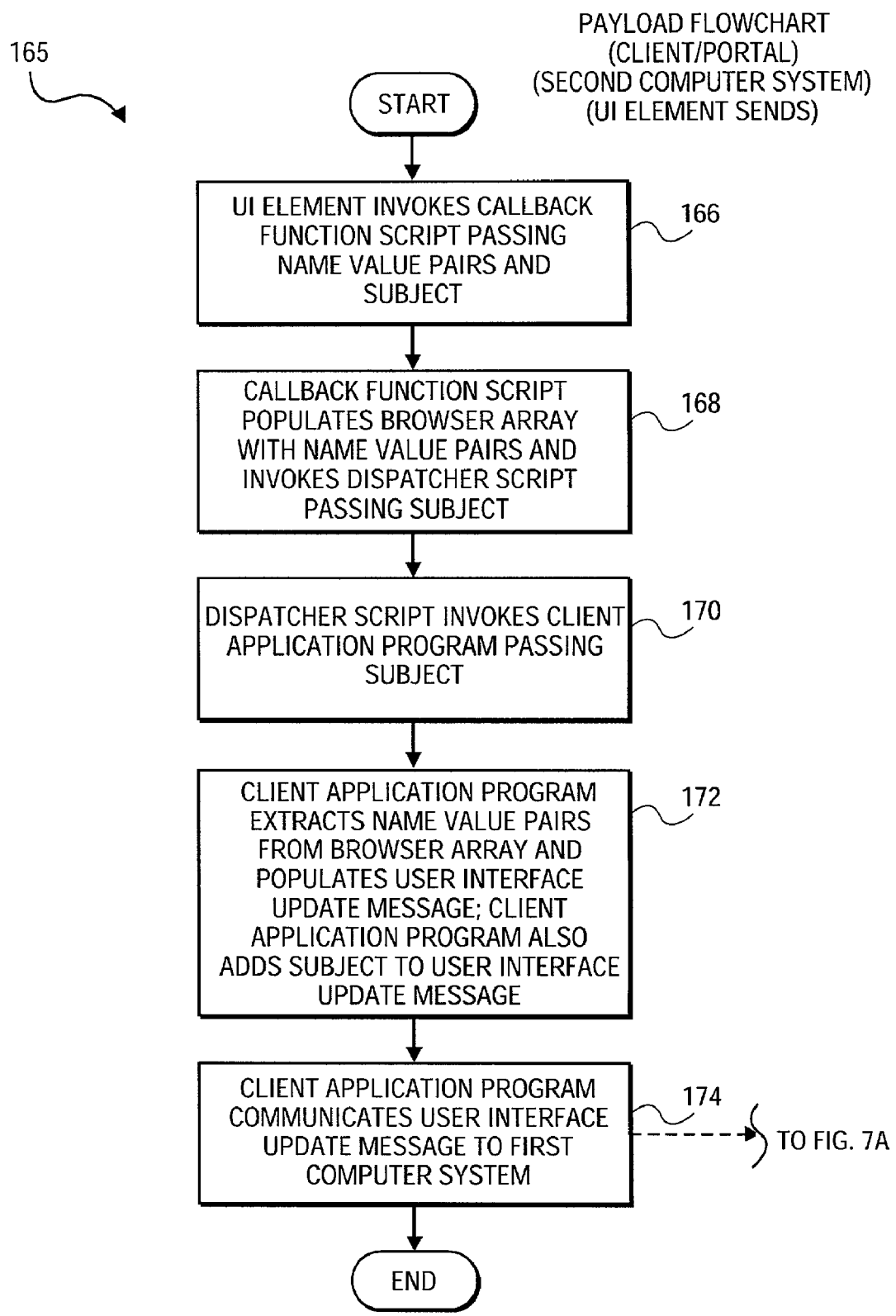
FIG. 7D is a flow chart illustrating an exemplary method of updating a plurality of user interface categories utilizing a single client application program where the user interface category transmits an update to the single client application program.

FIG. 7D is a flow chart illustrating an exemplary (web) payload process 165 where the user interface element 88, contained within a user interface category, updates the script 90 at an exemplary second computer system in the form of a portal (client) computer 42 and an exemplary user interface update in the form of processing at box 166.

At box 166, a user interface element 88 sends a user interface update to the callback function script 90 by passing name value pairs via the DOM interface of the browser. At box 168, the callback function script 90 populates browser array 177, shown in FIG. 9, with the name value pairs and invokes the dispatcher script 90 passing a subject. At box 170, the dispatcher script invokes the client application program 82 also passing the subject.

At box 172, the client application program 82 constructs the user interface update message 94. The client application program 82 extracts the name value pairs from the browser array 177 and enters them into the user interface update message 94. At box 174, the client application program 82 sends the user interface update message 94 to the first computer 40 and the client application program 82 stops.

Database Structure

FIG. 8 is a diagram illustrating an exemplary user interface element table 176. The user interface element table 176 is a software array maintained in the memory of the client computers 42, 44 and 46 that contains two types of entries for each of the user interface elements 88 that appears on the displays of the client computers 42, 44 and 46.

The user interface element table 176 is constructed at the client computer 42. The script 90 populates the user interface element table 176 from the contents of the user interface data message 93, which includes the callback function scripts 90 and the user interface elements 88 with subjects to which they subscribe. The user interface element table 176 is initialized with a subscription subject entry and a callback function script entry corresponding to each user interface element 88 in the user interface data message 93.

The user interface element table 176 is used to facilitate sending and receiving the name value pairs both to and from the user interface elements 88 at payload time.

A subscription subject entry in the user interface element table 176 identifies subjects listened or subscribed to by the respective user interface element 88. When the subject of a user interface update message 94 matches one of the subjects that appear in a subject entry in the user interface element table 176, the corresponding callback function script 90 is invoked to send the name value pairs to the corresponding user interface element 88.

FIG. 9 is a diagram illustrating an exemplary browser array 169. The browser array 169 is a software array maintained in the memory of the client computers 42, 44 and 46 that contains a variable number of the name value pairs. The name value pairs are a standard mechanism for identifying an item on a HTML, XML, SGML, etc. page and specifying some attribute with respect to that item. For instance, the graphical image of a dog on a web page may have an item COLOR that has the attribute of BROWN. Thus, the browser array 169 temporarily stores name value pairs that are passed between the software components at the client computers 42, 44 and 46.

The browser array 169 is not used at page build time.

The browse array 169 is used to pass the name value pairs from the remote user interface elements 88 to the local user interface elements 88 and to pass the name value pairs from the local user interface elements 88 to the remote user interface elements 88 at payload time.

FIG. 10 is a diagram illustrating an exemplary subscription subject table 178. The subscription subject table 178 is a software array maintained in the memory of the bridge computer 40 that contains one record for each of the portal computers (e.g., 42, 44 and 46) that is connected to the bridge computer 40. The agent process 86 at the bridge computer 40 adds a record to the subscription subject table 178 when the portal computer 42, 44 and 46 sends a subscription subject message 92. Conversely, the agent process 86 removes a record from the subscription subject table 178 when a point-to-point connection previously established between the bridge node computer 40 and the portal computer 42, 44, and 46 is broken down.

A single record in the subscription subject table 178 contains a variable number of subjects. A registered subject indicates that at least one of the user interface elements 88 at the associated portal computer 42, 44, and 46 listens or subscribes to the user interface update messages 94 that are published with respect to the subject.

Message Structures

Figure 11:
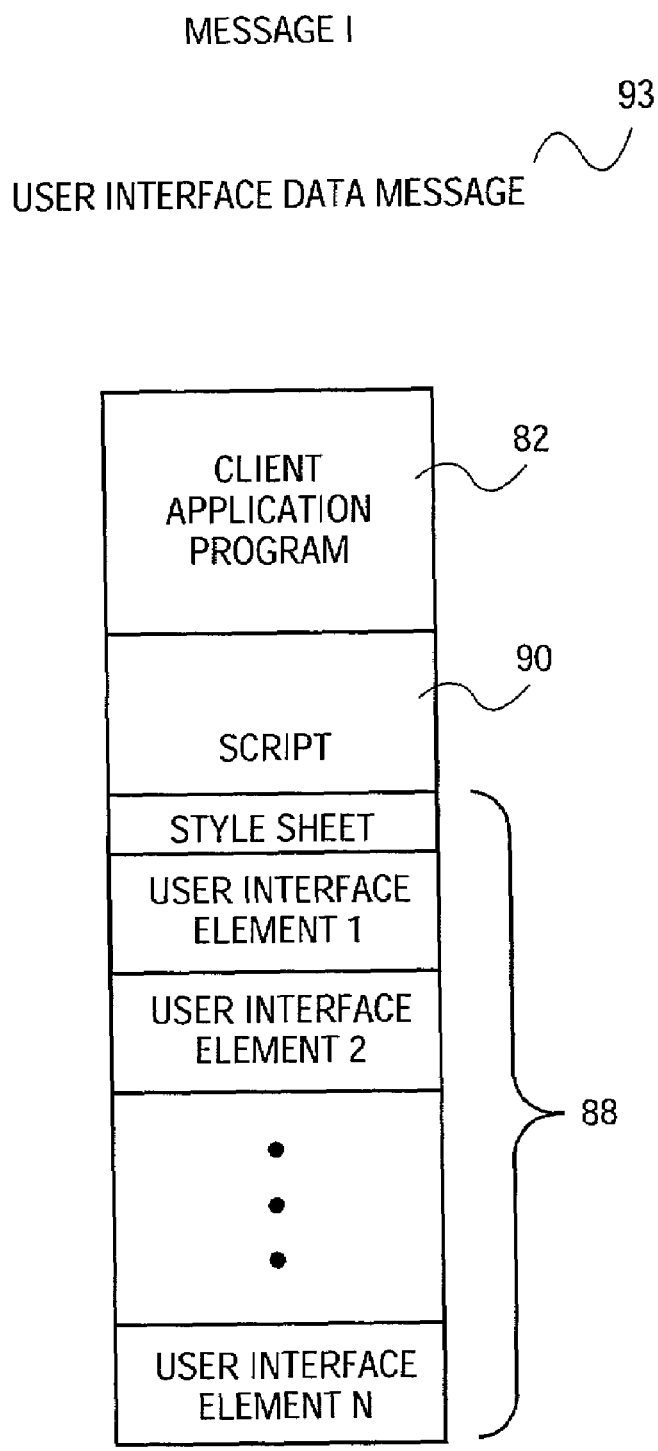
FIG. 11 is a diagram illustrating an exemplary user interface data message.

FIG. 11 is a diagram illustrating an exemplary user interface data message 93. The bridge node computer 40 sends the user interface data message 93 to a client computer 42, 44, and 46 in response to a user request for a web page with the user interface elements 88. The user interface data message 93 includes the client application program 82, script 90, and a variable number of the user interface elements 88 with the optional style sheets 88. Also included in the user interface data message 93, though not shown, each user interface element 88 is identified with a user interface category and one or more subscription subjects.

Figure 12:
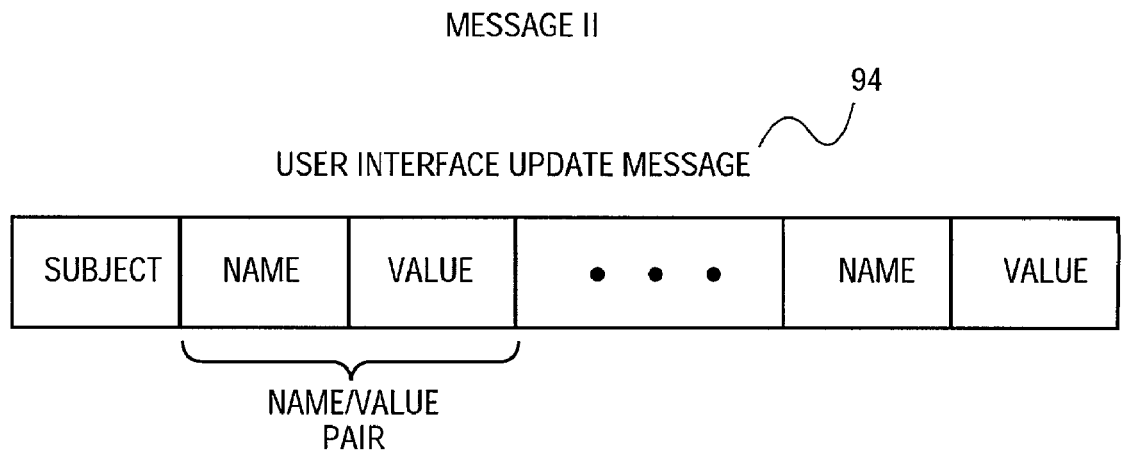
FIG. 12 is a diagram illustrating an exemplary user interface update message.

FIG. 12 is a diagram illustrating an exemplary user interface update message 94. The user interface update message 84 contains a variable number of the name value pairs that are used to update the user interface elements 88 contained inside of user interface categories on the user interface screen.

The client computer 42 sends and receives the user interface update message 94 to and from the server computer 40.

The client computer 42 sends the user interface update message 94 when information is entered via a user interface element 88. The client computer 42 receives a user interface update message 94 when the message subject is listened or subscribed to by a user interface element 88 that is displayed at the client computer 42.

Figure 13:
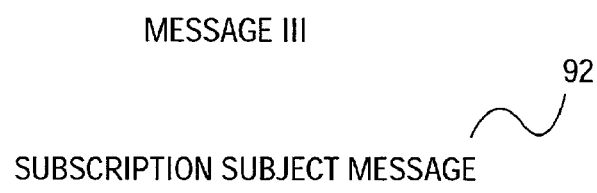
FIG. 13 is a diagram illustrating an exemplary subscription subject message.
Figure 13:
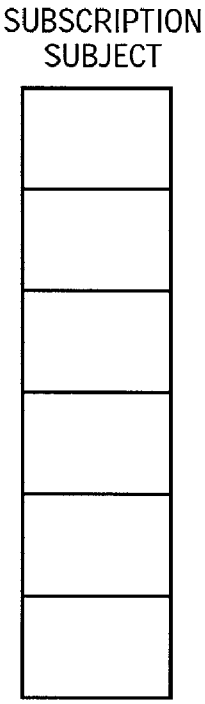

FIG. 13 is a diagram illustrating an exemplary subscription subject message 92. The portal computer 42 sends the subscription subject message 92 to the bridge node computer 40 to identify the subjects listened or subscribed to by all the user interface elements 88.

User Interface

FIG. 14 is a mock up of an exemplary user interface in the form of a web page titled Sports Headlines 170 illustrating exemplary user interface elements 88 in the form of HTML elements 182, 184, 186 and 188 and an exemplary user interface categories in the form of category 181 including HTML elements 182 and 186 and category 185 including HTML elements 184 and 188. Sports Headlines 180 is representative of web pages that would appear at the client computers 42, 44, and 46.

The HTML element 182 accepts user input for publication to the subject "Baseball News". Input received is published to and communicated throughout the messaging infrastructure in a user interface update message 94 that is identified by the subject "news.sports.baseball". Similarly the HTML element 184 accepts input for publication to the subject "new.sports.other".

The HTML element 186 displays text strings that are published to the subject "news.sports.baseball". Similarly, the HTML element 188 displays text strings that are published to the subject "news.sports.other".

A single client application program is utilized at the client computer for the purpose of sending and receiving updates from HTML elements 182, 184, 186 and 188 irrespective of the number of users interface categories on the "Sports Headlines" web page.

Computer System

Figure 15:
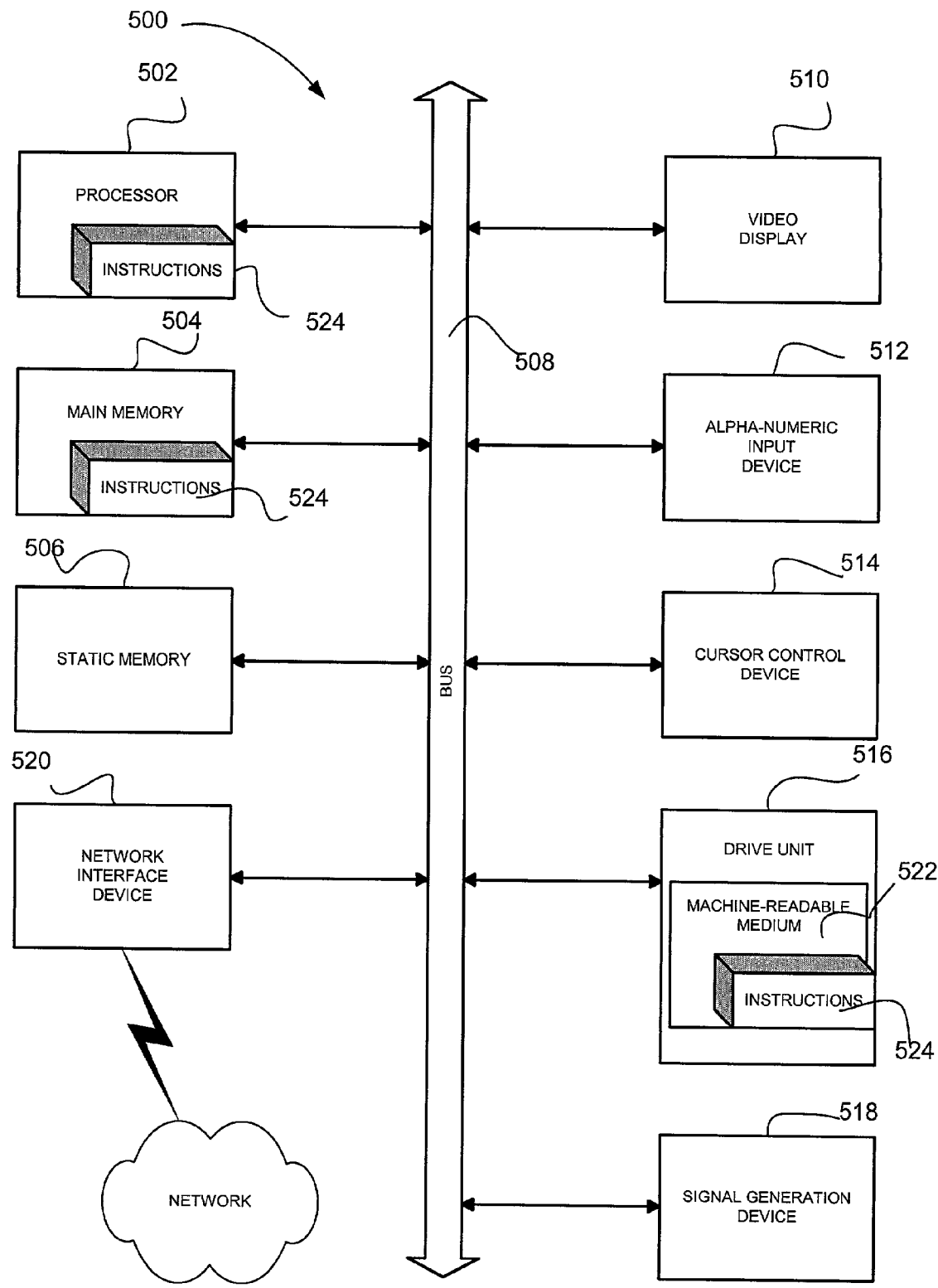
FIG. 15 shows a diagrammatic representation of machine in the exemplary form of a computer system within which a set of instructions, for causing the machine to perform any one of the methodologies discussed, may be executed.

FIG. 15 shows a diagrammatic representation of machine in the exemplary form of a computer system 500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored a set of instructions (i.e., software) 524 embodying any one, or all, of the methodologies described above. The software 524 is also shown to reside, completely or at least partially, within the main memory 504 and/or within the processor 502. The software 524 may further be transmitted or received via the network interface device 520. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and a system for facilitating the update of a plurality of user interface elements utilizing a single client application program have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to facilitate the update of a plurality of user interface categories utilizing a single client application program, the method including:

at a first computer system, generating a user interface data message wherein the user interface data message includes the plurality of user interface categories and the single client application program, wherein the single client application program executes at a second computer system, wherein each user interface category includes a user interface element, and wherein each user interface element comprises a dynamic element that defines the appearance of information displayed by the second computer system;

communicating the user interface data message from the first computer system to the second computer system;

receiving a user interface update message, at the first computer system wherein the user interface update message includes an update to the plurality of user interface categories; and communicating the user interface update message from the first computer system to the second computer system to enable the single client application program, at the second computer system, to update the plurality of user interface categories, by communicating the update to a script and the script, in turn, updating the respective user interface elements.

2. The method of claim 1, wherein the first computer system comprises a server and the second computer system comprises a client.

3. The method of claim 1, including, at the second computer system, generating a user interface element table wherein the user interface element table includes a call back function script and subscription subjects for each user interface element.

4. The method of claim 3, including, at the second computer system, reading the user interface element table and invoking the appropriate call back function script.

5. The method of claim 4, wherein the call back function script updates the user interface element with a display object model method.

6. The method of claim 1, wherein the single client application program populates a browser array with a name value pair for the user interface element.

7. The method of claim 6, wherein the single client application program communicates the user interface update message to the script, and the script in turn updates the user interface element, wherein the script reads a name value pair from the browser array.

8. The method of claim 1, wherein each user interface element is constructed from a text embedded with tags.

9. The method of claim 8, wherein the text embedded with tags is implemented as a Special Generalized Markup Language (SGML).

10. The method of claim 9, wherein the SGML is a Hypertext Markup Language (HTML).

11. The method of claim 9, wherein the SGML is Extensible Markup Language (XML).

12. The method of claim 9, wherein a Simple Object Access Protocol (SOAP) defines a messaging framework for transferring the user interface data message.

13. The method of claim 1, wherein the user interface data message further comprises an at least one of a plurality of Style Sheets.

14. The method of claim 13, wherein the at least one of a plurality of style sheets is a Cascading Style Sheet.

15. The method of claim 1, wherein the single client application program operates under a browser.

16. The method of claim 15, wherein the single client application program is a Java applet.

17. The method of claim 1, wherein the script executes under a browser at the second computer system.

18. The method of claim 1, wherein the single client application program updates at least one of a plurality of user interface categories.

19. A method to facilitate updating a plurality of user interface categories utilizing a single client application program, the method including:

at a first computer system, receiving a user interface data message from a second computer system, wherein the user interface data message includes the plurality of user interface categories and the single client application program, wherein the single client application program executes at the first computer system, wherein each user interface category includes a user interface element, and wherein each user interface element comprises a dynamic element that defines the appearance of information displayed by the first computer system;

sending a subscription subject message from the first computer system to the second computer system, the subscription subject message including a list of subscription subjects subscribed to by each user interface element of each category;

at the first computer system, the single client application program receiving a user interface update message, for subjects that have been subscribed to, from the second computer system; and the single client application program updating the plurality of user interface categories, by communicating the update to a script and the script, in turn, communicating the update to the plurality of user interface categories to update the respective user interface elements.

20. The method of claim 19, wherein the single client application program is an MS Com object.

21. A method to facilitate receiving a user interface update from a plurality of user interface categories utilizing a single client application program, the method including:

at a first computer system, generating a user interface data message wherein the user interface data message includes the plurality of user interface categories and the single client application program, wherein the single client application program executes at a second computer system, wherein each user interface category includes a user interface element, and wherein each user interface element comprises a dynamic element that defines the appearance of information displayed by the second computer system;

communicating the user interface data message from the first computer system to the second computer system;

at the first computer system, receiving a subscription subject message, the subscription subject message including a list of subscription subjects subscribed to by the user interface elements;

at the first computer system, receiving a user interface update message from the second computer system, wherein the user interface update message is generated at the second computer system by the user interface element that communicates a user interface update to a script and the script, in turn, communicating the update to the single client application program, the single client application program communicating the user interface update message to the first computer system.

22. A method to facilitate communication of a user interface update from a plurality of user interface categories, utilizing a single client application program, the method including:

at a first computer system, receiving a user interface data message from a second computer system, wherein the user interface data message includes the plurality of user interface categories and the single client application program, wherein the single client application program executes at the first computer system, wherein each user interface category includes a user interface element, and wherein each user interface element comprises a dynamic element that defines the appearance of information displayed by the first computer system;

sending a subscription subject message to the second computer system, the subscription subject message including a list of subscription subjects subscribed to by each user interface element of each category;

at the first computer system, a user interface element communicating the user interface update to a script and the script, in turn, communicating the update to the single client application program, and the single client application, in turn, communicating the user interface update message to the second computer system.

23. A system to facilitate an update to a plurality of user interface categories utilizing a single client application program, the system comprising:
 a first computer system; and
 a second computer system communicatively connected to the first computer system;
 wherein the first computer system comprises an agent process that communicates a user interface data message to the second computer system;
 wherein the user interface data message includes the single client application program and the plurality of user interface categories;
 wherein the single client application program executes at the second computer system;
 wherein each user interface category includes a user interface element;
 wherein each user interface element comprises a dynamic element that defines the appearance of information displayed by the second computer system;
 wherein the first computer system further comprises a communication process that communicates a user interface update message to the agent process;
 wherein the user interface update message includes an update for the plurality of user interface categories;
 wherein the agent process, in turn, is adapted to communicate the user interface update message to the single client application program, at the second computer system, if the interface update message includes a subject that the single client application has subscribed to; and
 wherein the single client application program is adapted to update the plurality of user interface categories by updating a script, which, in turn, updates the plurality of user interface categories to update the respective user interface elements.

24. A system to facilitate updating a plurality of user interface categories, utilizing a single client application program, the system comprising:
 a first computer system to receive a user interface data message from a second computer system, wherein the user interface data message includes the single client application program and the plurality of user interface categories, wherein each user interface category includes a user interface element, and wherein each user interface element comprises a dynamic element that defines the appearance of information displayed by the first computer system;
 the single client application program, at the first computer system, to send a subscription subject message to the second computer system, the subscription subject message including a list of subscription subjects subscribed to by each user interface element of each category;
 the single client application program, at the first computer system, to receive an interface update message from the second computer system if the interface update message includes a subject that a user interface element has subscribed to; and
 the single client application to update the plurality of user interface categories, wherein the single client application program updates a script and the script, in turn, updates the plurality of user interface categories to update the respective user interface elements.

25. A system to facilitate reception of an update from a plurality of user interface categories, the system comprising:
 a first computer system; and
 a second computer system communicatively connected to the first computer system;
 wherein the first computer system comprises an agent process to communicate a user interface data message to the second computer system;
 wherein the user interface data message includes a first client application program and the plurality of user interface categories;
 wherein each user interface category includes a user interface element;
 wherein each user interface element comprises a dynamic element that defines the appearance of information displayed by the second computer system;
 wherein the agent process, in turn, is adapted to receive a user interface update message from the first client application program;
 wherein the user interface update message is identified with a subject and generated, at the second computer system, by a user interface element adapted to communicate an update to the first client application program; and
 wherein the agent process is to communicate the user interface update message to a communication process at the first computer system, and the communication process is to multicast the user interface update message to any computer system executing a client application program that has subscribed, with the first computer system, to receive user interface update messages identified with the subject.

26. A system to facilitate communication of an update from a plurality of user interface categories, the system comprising:
 a first computer system to receive a user interface data message from a second computer system wherein the user interface data message includes a first client application program and the plurality of user interface categories, wherein each user interface category includes a user interface element, and wherein each user interface element comprises a dynamic element that defines the appearance of information displayed by the first computer system:
 the user interface element to communicate an update to the first client application program; and
 the first client application program to communicate a user interface update message identified with a subject to the second computer system, the second computer system to multicast the interface update message to any computer system executing a client application program that has subscribed, with the second computer system, to receive interface update messages identified with the subject.

27. A method to facilitate communication of an update to a plurality of user interface categories utilizing a single client application program, the method comprising:
 at a primary computer system, multicasting a user interface update message wherein the user interface update message is identified with a subject;
 at a secondary computer system, receiving the user interface update message;
 communicating the user interface update message to a tertiary computer system wherein the tertiary computer system is listening for the user interface update message wherein the user interface update message is identified by the said subject;

at the tertiary computer system, a single client application program receiving the user interface update message; and the single client application program in turn updating the plurality of user interface categories, wherein the plurality of user interface categories listens to the subject, wherein each category includes a user interface element, and wherein each user interface element comprises a dynamic element that defines the appearance of information displayed by the tertiary computer system, the single client application program updating a script and the script, in turn, updating the plurality of user interface categories to update the respective user interface elements.

28. A method to facilitate communication of an update from a plurality of user interface categories utilizing a single client application program, the method comprising:

at a source computer system, a user interface element comprising dynamic element that defines the appearance of information displayed by the source computer system, the user interface element in a category and communicating an update to the single client application program wherein the update is identified with a subject;

the single client application program, in turn, communicating the user interface update message to an intermediary computer system;

at the intermediary computer system, receiving the user interface update message;

multicasting the user interface update message to a destination computer system; and at the destination computer system, receiving a user interface update message, communicating the update to the single client application and, in turn, communicating the update to a script and the script, in turn, communicating the update to a user interface element.

29. A system to facilitate the update of a plurality of user interface categories utilizing a single client application program, the system comprising:

a first computer system; and a second computer system communicatively connected to the first computer system;

wherein the first computer system comprises a first means for communicating a user interface data message to the second computer system;

wherein the user interface data message includes the single client application program and the plurality of user interface categories;

wherein the single client application program executes at the second computer system;

wherein each user interface category includes a user interface element;

wherein each user interface element comprises a dynamic element that defines the appearance of information displayed by the second computer system;

wherein the first computer system further comprises a second means for communicating a user interface update message to the first means;

wherein the user interface update message includes an update for the plurality of categories; and wherein the first means is further adapted for communicating the user interface update message to the single client application program, at the second computer system, the single client application program for updating the plurality of categories, the single client application program to update a script and the script, in turn, to update the plurality of categories to update the respective user interface elements.

30. The system of claim 29, wherein the single client application program is a Java applet.

31. The system of claim 29, wherein each user interface element is constructed from a text embedded with tags.

32. The system of claim 29, including generating a user interface element table that includes a call back function script and subscription subjects for each user interface element.

33. A tangible, machine readable medium storing a sequence of instructions that, when executed by a machine, cause the machine to:

generate a user interface data message wherein the user interface data message includes a plurality of user interface categories and a client application program, wherein the client application program executes at a second computer system, wherein each user interface category includes a user interface element, and wherein each user interface element comprises a dynamic element that defines the appearance of information displayed by the second computer system;

communicate the user interface data message to the second computer system;

receive a user interface update message, wherein the user interface update message includes a subject and an update to the plurality of user interface categories; and communicate the user interface update message to any computer system executing a client application program that has subscribed to receive interface update messages identified with the subject.

* * * * *